United States Patent
Keil et al.

(10) Patent No.: US 9,533,538 B2
(45) Date of Patent: Jan. 3, 2017

(54) LOW PRESSURE HIGH COMPRESSION DAMPING MONOTUBE SHOCK ABSORBER

(71) Applicant: Tenneco Automotive Operating Company Inc., Lake Forest, IL (US)

(72) Inventors: Daniel Keil, Temperance, MI (US); Thomas Mallin, Temperance, MI (US); Zachary Lopez, Monroe, MI (US)

(73) Assignee: Tenneco Operating Automotive Company Inc., Lake Forest, IL (US)

( * ) Notice: Subject to any disclaimer, the term of this patent is extended or adjusted under 35 U.S.C. 154(b) by 119 days.

(21) Appl. No.: 14/459,394

(22) Filed: Aug. 14, 2014

(65) Prior Publication Data

US 2015/0047933 A1 Feb. 19, 2015

Related U.S. Application Data

(60) Provisional application No. 61/865,781, filed on Aug. 14, 2013.

(51) Int. Cl.
*F16F 9/06* (2006.01)
*B60G 13/08* (2006.01)
(Continued)

(52) U.S. Cl.
CPC ............. *B60G 13/08* (2013.01); *F16F 9/061* (2013.01); *F16F 9/066* (2013.01); *F16F 9/19* (2013.01);
(Continued)

(58) Field of Classification Search
CPC . B60G 13/08; B60G 2206/41; B60G 2202/24; B60G 2202/04; F16F 9/19; F16F 9/061; F16F 9/43; F16F 9/443; F16F 9/3271; F16F 9/348; F16F 9/44
(Continued)

(56) References Cited

U.S. PATENT DOCUMENTS 2,335,907 A * 12/1943 Boor ................. F16F 9/443
188/282.5
2,781,869 A 3/1951 Boehm et al.
(Continued)

FOREIGN PATENT DOCUMENTS

DE 3840352 6/1990
DE 19755365 A1 † 6/1998
(Continued)

OTHER PUBLICATIONS

Search Report and Written Opinion dated Nov. 5, 2014 from corresponding PCT Application No. PCT/US2014/051062 (10 pages).
(Continued)

*Primary Examiner* — Christopher Schwartz
(74) *Attorney, Agent, or Firm* — Harness, Dickey & Pierce, P.L.C.

(57) ABSTRACT

A monotube shock absorber which is capable of high compression damping forces while operating at low pressure for reduced friction is disclosed. The monotube shock absorber includes a pressure tube, a piston assembly, a piston rod, a fixed valve assembly and a floating piston. A variety of methods for securing the fixed valve assembly to the pressure tube are disclosed including use of single piece pressure tubes and pressure tube assemblies. In addition, a method for assembling the monotube shock absorber including an oil filling technique is described.

2 Claims, 8 Drawing Sheets

(51) Int. Cl.
*F16F 9/32* (2006.01)
*F16F 9/19* (2006.01)

(52) U.S. Cl.
CPC ............. *F16F 9/325* (2013.01); *F16F 9/3271* (2013.01); *B60G 2202/24* (2013.01); *B60G 2206/41* (2013.01); *Y10T 29/49615* (2015.01)

(58) Field of Classification Search
USPC ................ 188/282.5, 282.6, 322.15, 322.22
See application file for complete search history.

(56) References Cited

U.S. PATENT DOCUMENTS

| | | | | |
|---|---|---|---|---|
| 3,070,191 | A | * | 12/1962 | Allinquant .............. F16F 9/348 188/317 |
| 3,225,870 | A | | 12/1965 | Heckethorn |
| 3,830,347 | A | | 8/1974 | Fader et al. |
| 3,945,474 | A | | 3/1976 | Palmer |
| 4,106,596 | A | * | 8/1978 | Hausmann ............... B62D 7/22 188/269 |
| 4,274,515 | A | | 6/1981 | Bourcier de Carbon |
| 4,407,396 | A | | 10/1983 | Sirven |
| 4,408,751 | A | | 10/1983 | Dodson et al. |
| 4,423,801 | A | | 1/1984 | Miura |
| 4,788,747 | A | | 12/1988 | Ludwig |
| 4,972,928 | A | | 11/1990 | Sirven |
| 5,458,219 | A | * | 10/1995 | Anderson ................. F16F 9/43 188/315 |
| 5,913,391 | A | | 6/1999 | Jeffries et al. |
| 6,851,528 | B2 | | 2/2005 | Lemieux |
| 6,913,127 | B2 | | 7/2005 | Holiviers et al. |
| 6,981,578 | B2 | | 1/2006 | Leiphart et al. |
| 7,374,028 | B2 | * | 5/2008 | Fox .......................... F16F 9/44 188/322.13 |
| 7,789,208 | B2 | * | 9/2010 | Yang .................... F16F 9/3484 188/282.6 |
| 2009/0049767 | A1 | | 2/2009 | Georgakis |
| 2009/0223763 | A1 | | 9/2009 | Lude |
| 2010/0181154 | A1 | * | 7/2010 | Panichgasem .......... F16F 9/061 188/280 |

FOREIGN PATENT DOCUMENTS

| | | |
|---|---|---|
| JP | 39-023430 | 8/1964 |
| JP | 08-014300 | 1/1996 |
| JP | 08-189540 | 7/1996 |
| JP | 2006-194328 | 7/2006 |

OTHER PUBLICATIONS

Circa 1980 German Book, pp. 188-193 with Google translation.
Circa 1980 German Book, pp. 302-305 with Google translation.
Dr. John C. Dixon, Shock Absorber Handbook, Second Edition, 1 PG, Sep. 28, 2007, SAE International and John Wiley & Sons Ltd., West Sussex England.†
Jörnsen Reimpell and Helmut Stoll, Fahrwerktechnik: Stoβ- und Schwingungsdämpfer, pp. 4-9 and 244-273, 2nd Edition 1989, Vogel Verlag und Druck KG, Germany, ISBN 3-8343-3220-8.†

\* cited by examiner
† cited by third party

LOW PRESSURE HIGH COMPRESSION DAMPING MONOTUBE SHOCK ABSORBER

CROSS-REFERENCE TO RELATED APPLICATIONS

This application claims the benefit of U.S. Provisional Application No. 61/865,781 (filed on Aug. 14, 2013), the entire disclosure of which is incorporated herein by reference.

FIELD

The present disclosure relates to a low pressure, high compression, damping monotube shock absorber.

BACKGROUND

This section provides background information related to the present disclosure which is not necessarily prior art.

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the automobile.

The most common type of shock absorbers for automobiles are the dashpot type in which a piston is located within a pressure tube and is connected to the sprung mass of the vehicle through a piston rod. The piston divides the pressure tube into an upper working chamber and a lower working chamber. Because the piston, through valving, has the ability to limit the flow of damping fluid between the upper and lower working chambers within the pressure tube when the shock absorber is compressed or extended, the shock absorber is able to produce a damping force which counteracts the vibrations which would otherwise be transmitted from the unsprung mass to the sprung mass. In a dual tube shock absorber, a fluid reservoir is defined between the pressure tube and a reserve tube which is positioned around the pressure tube. A base valve is located between the lower working chamber and the fluid reservoir to also produce a damping force which counteracts the vibration which would otherwise be transmitted from the unsprung portion to the sprung portion of the automobile during stroking of the shock absorber.

A conventional monotube shock absorber typically includes highly pressurized hydraulic fluid because its ability to dampen vibrations is limited by the initial static pressure of the hydraulic fluid. Having to maintain a high initial static pressure is undesirable for a number of reasons. A monotube shock absorber configured to operate at a lower pressure, thus reducing friction at the seals, would therefore be desirable. A monotube shock absorber that does not experience excessive noise caused by cavitation would also be desirable. Furthermore, methods and devices for securing a fixed valve assembly within a tube of a monotube shock absorber would be desirable.

SUMMARY

This section provides a general summary of the disclosure, and is not a comprehensive disclosure of its full scope or all of its features.

The present disclosure is directed to a monotube shock absorber that can operate at low pressure and still provide high compression damping.

The present teachings provide for a monotube shock absorber including a pressure tube, a fixed valve assembly, a piston rod, a piston assembly and a floating piston. The pressure tube includes a first end and a second end. The floating piston is slidably mounted in the pressure tube and it defines a gas chamber between the floating piston and the first end. The fixed valve assembly is fixedly mounted within the pressure tube to define a compensation chamber between the fixed valve assembly and the floating piston. The fixed valve assembly is configured to permit passage of hydraulic fluid therethrough. The piston assembly is slidably seated within the pressure tube to define a rebound chamber between the piston assembly and the second end, and to define a compression chamber between the piston assembly and the fixed valve assembly. The piston assembly is attached to the piston rod configured to move the piston assembly towards the fixed valve assembly during a compression stroke and away from the fixed valve assembly during an extension stroke. The piston assembly includes piston valve assemblies configured to permit hydraulic fluid to pass therethrough. During the compression stroke, the piston assembly forces hydraulic fluid out of the compression chamber and into the compensation chamber through the fixed valve assembly generating an increase in pressure in the compression chamber. Simultaneously, hydraulic fluid is forced out of the compression chamber and into the rebound chamber through one of the piston valve assemblies generating a decrease in pressure in the rebound chamber. The pressure drop across the fixed valve assembly and the pressure drop across the piston valve assembly both contribute to generating compression damping force. During the extension stroke, the piston assembly forces hydraulic fluid out of the rebound chamber and into the compression chamber through another one of the piston valve assemblies to generate an increase in pressure in the rebound chamber. Simultaneously, hydraulic fluid is drawn from the compensation chamber into the compression chamber through the fixed valve assembly thereby decreasing pressure in the compression chamber. The compression chamber pressure decrease is made small by reducing the restriction to flow through the fixed valve assembly during the extension stroke, the pressure drop across the piston valve assembly primarily generates extension damping force.

The present teachings also provide for a monotube shock absorber including a pressure tube assembly, an adaptor or adaptor assembly, a fixed valve assembly, a piston rod, a piston assembly and a floating piston. The pressure tube assembly includes a first tube having a first end and a second tube separate and spaced apart from the first tube and having a second end. The adaptor or adaptor assembly is configured to connect the first tube and the second tube of the tube assembly together. The floating piston is slidably mounted in the pressure tube and it defines a gas chamber between the floating piston and the first end of the first tube. The fixed valve assembly is coupled to the adaptor or adaptor assembly to mount the fixed valve assembly in the pressure tube assembly, and define a compensation chamber between the fixed valve assembly and the floating piston. The fixed valve assembly is configured to permit passage of hydraulic fluid therethrough. The piston assembly is slidably seated within the second tube to define a rebound chamber between the piston assembly and the second end of the second tube, and to define a compression chamber between the piston assembly and the fixed valve assembly. The piston assembly is attached to the piston rod configured to move the piston assembly towards the fixed valve assembly during a compression stroke, and away from the fixed valve assembly during an extension stroke. The piston assembly includes piston valve assemblies configured to permit hydraulic fluid to pass therethrough.

The present teachings further provide for a method for assembling a monotube shock absorber. The method includes: inserting a floating piston and a fixed valve assembly in a pressure tube such that the floating piston abuts or nearly abuts the fixed valve assembly in the pressure tube, and such that the floating piston is between the fixed valve assembly and a first end of the pressure tube to define a gas chamber between the floating piston and the first end; rigidly affixing the fixed valve assembly to the pressure tube; adding a first amount of a hydraulic fluid into the pressure tube from a second end of the pressure tube that is opposite to the first end such that the hydraulic fluid covers a side of the valve assembly that is opposite to the floating piston; advancing a plunger into the pressure tube from the second end to push less than an entirety of the hydraulic fluid through the fixed valve assembly and into contact with the floating piston to push the floating piston to a first distance away from the fixed valve assembly thereby defining a compensation chamber between the fixed valve assembly and the floating piston filled with the hydraulic fluid; adding a second amount of the hydraulic fluid into the pressure tube from the second end; inserting a rod guide assembly into the pressure tube from the second end with both a piston rod and a piston assembly coupled to the piston rod in cooperation with the rod guide assembly. As the rod guide assembly is inserted the hydraulic fluid passes through a piston valve assembly of the piston assembly to occupy a gap between the piston assembly and the rod guide assembly and the hydraulic fluid is further pushed through the valve assembly into the compensation chamber to move the floating piston to a second distance away from the valve assembly and further towards the first end; and charging the gas chamber through an opening in the pressure tube at the gas chamber. The piston assembly defines a compression chamber between the piston assembly and the fixed valve assembly, and defines a rebound chamber between the piston assembly and the rod guide assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The following description of the preferred embodiment(s) is merely exemplary in nature and is in no way intended to limit the invention, its application, or uses.

Figure 1:
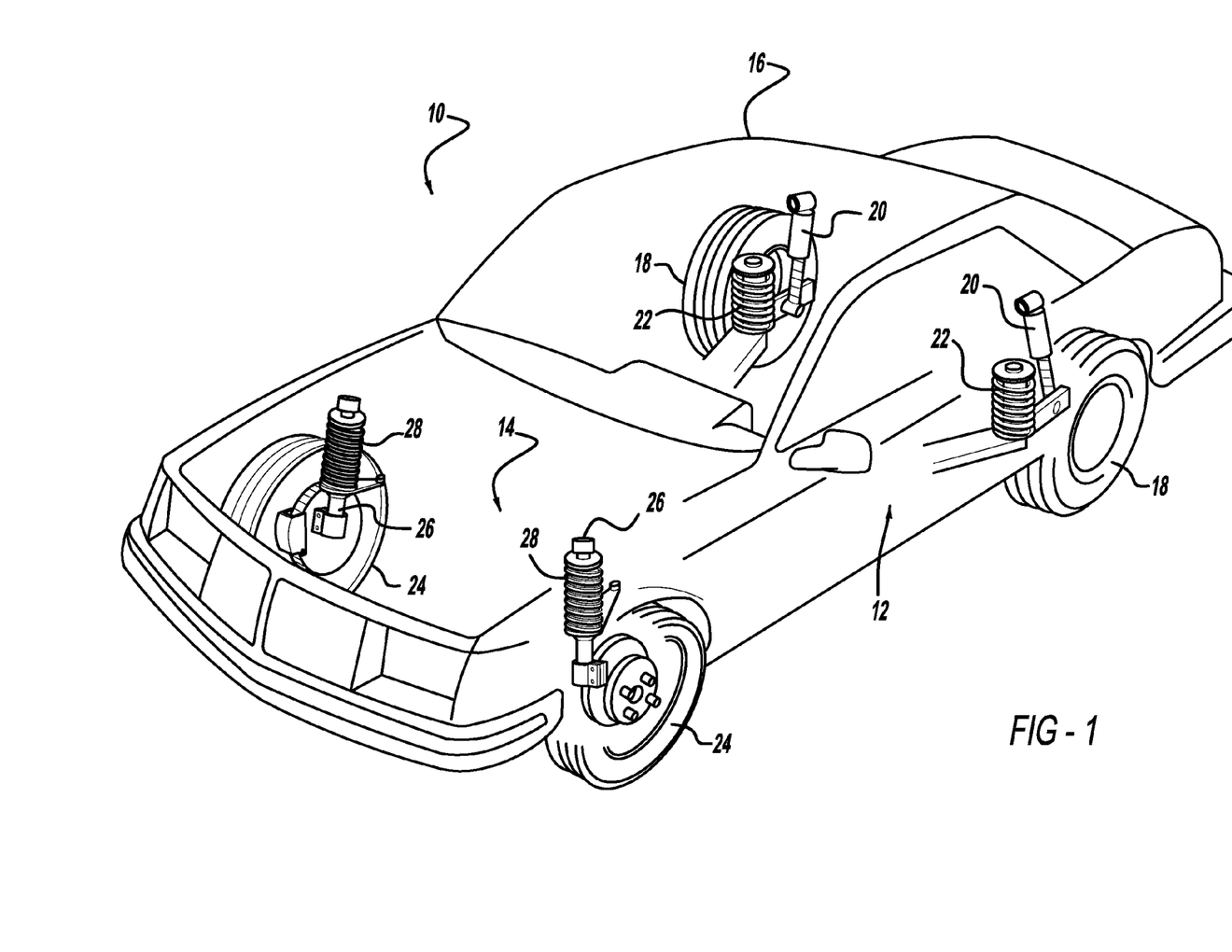
FIG. 1 is a schematic representation of a typical automobile which incorporates the monotube shock absorbers in accordance with the present disclosure.

Referring now to the drawings in which like reference numerals designate like or corresponding parts throughout the several views; there is shown in FIG. 1 a vehicle incorporating a suspension system incorporating the shock absorbers in accordance with the present invention and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of monotube shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of monotube shock absorbers 26 and by a pair of helical coil springs 28. Monotube shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, monotube shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figures 2, 3:
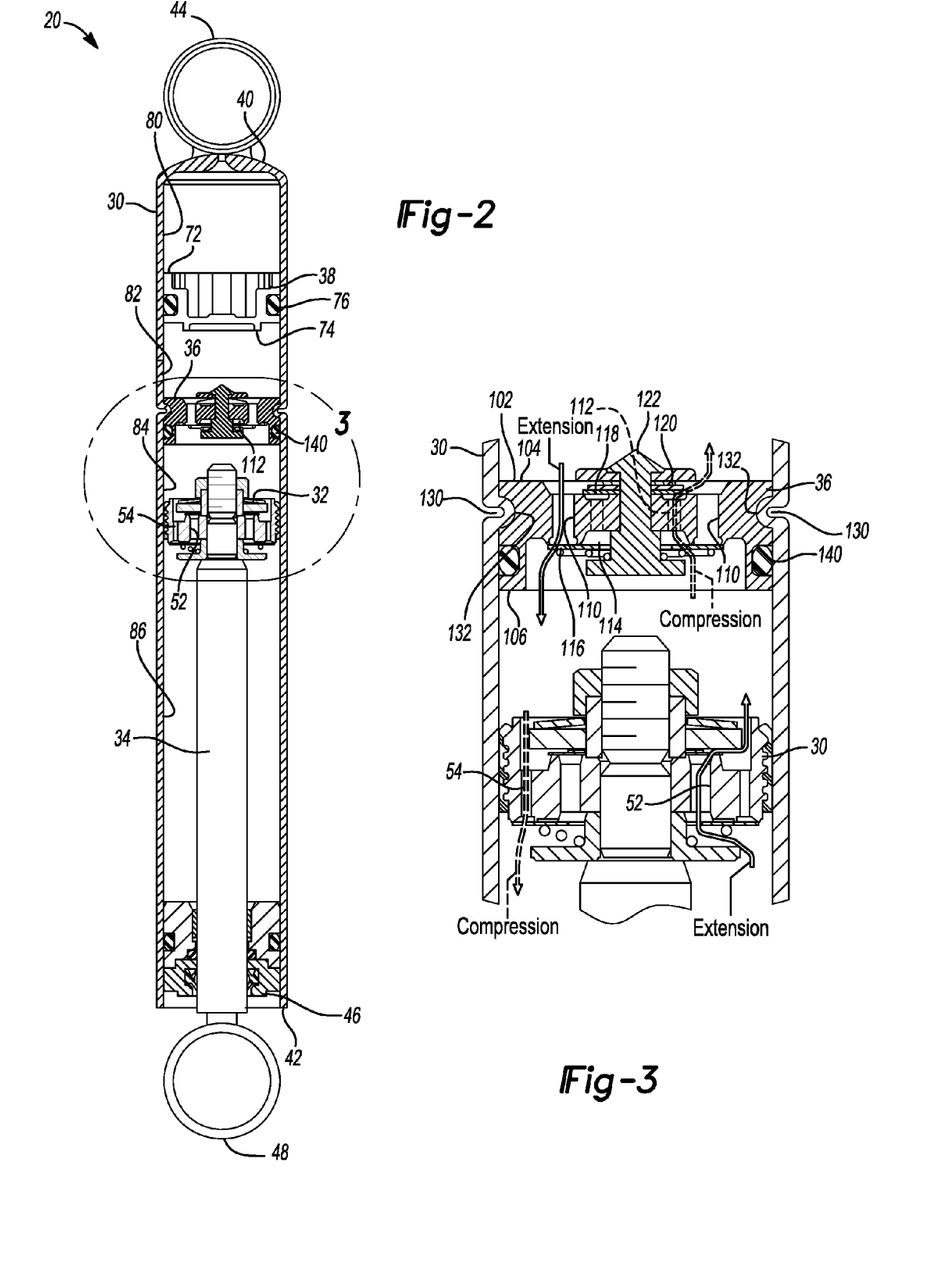
FIG. 2 is a cross-sectional view of a monotube shock absorber according to the present teachings.
FIG. 3 is a cross-sectional view of the detail of area 3 in FIG. 2.

Referring now to FIG. 2, monotube shock absorber 20 is shown in greater detail. While FIG. 2 illustrates only monotube shock absorber 20, it is to be understood that monotube shock absorber 26 also includes the features described below for monotube shock absorber 20. Monotube shock absorber 26 only differs from monotube shock absorber 20 in the manner in which it is adapted to be connected to the sprung and unsprung masses of vehicle 10. Monotube shock absorber 20 comprises a pressure tube 30, a piston assembly 32, a piston rod 34, a fixed valve assembly 36 and a floating piston 38.

Pressure tube 30 has a first end 40 and a second end 42. Extending between first and second ends 38 and 40 is an outer wall and an inner wall of pressure tube 30. The outer wall is opposite to the inner wall.

At first end 40 is a first mount 44. First mount 44 can be any suitable mounting device or structure for securing monotube shock absorber 20 to any suitable portion of a vehicle's suspension. For example, first mount 44 can be coupled to any suitable portion of the vehicle's sprung mass or unsprung mass.

At second end 42 is a rod guide assembly 46. Rod guide assembly 46 is secured within pressure tube 30 at second end 42 in any suitable manner. For example, rod guide assembly 46 can define a recess which is sized, shaped, and positioned to cooperate with a coupling flange extending from the inner wall of pressure tube 30. Any suitable number of recesses and coupling flanges can be included about rod guide assembly 46 and the inner wall of pressure tube 30 respectively. The coupling flanges can be formed in any suitable manner, such as by crimping.

Rod guide assembly 46 further includes a tube seal, which can be any suitable seal to prevent passage of hydraulic fluid between rod guide assembly 46 and the inner wall of pressure tube 30. The tube seal can be any suitable type of seal, such as an O-ring seal. Rod guide assembly 46 further includes a rod seal extending about a bore defined by rod guide assembly 46. The bore extends through rod guide assembly 46 to accommodate piston rod 34. The rod seal can be any suitable seal configured to prevent passage of hydraulic fluid between the bore defined by rod guide assembly 46 and piston rod 34 so that hydraulic fluid is unable to escape out from within pressure tube 30.

At an end of piston rod 34 is a second mount 48. Second mount 48 can be any suitable mounting device or structure configured to mount monotube shock absorber 20 to a vehicle. For example, the second mount 48 can be configured to couple with an unsprung or sprung mass of a vehicle.

Piston assembly 32 is mounted to piston rod 34, and is slidably movable within pressure tube 30 during compression strokes and extension strokes of piston rod 34. During a compression stroke, piston assembly 32 is moved towards first end 40 and away from second end 42. During the extension stroke, the piston assembly 32 is moved away from first end 40 and towards second end 42.

Piston assembly 32 generally includes extension valving 52 and compression valving 54. The extension and compression valving 52 and 54 can be any suitable type of valving configured to selectively permit or restrict passage of hydraulic fluid therethrough at a predetermined rate during compression and extension of the piston rod 34.

Floating piston 38 generally includes a first end 72 and a second end 74, which is opposite to first end 72. Extending about a peripheral sidewall of floating piston 38 between first end 72 and second end 74 is a seal 76. Seal 76 can be any suitable seal, such as an O-ring, suitable to prevent passage of hydraulic fluid between floating piston 70 and pressure tube 30. Seal 76 thus sealingly mates with the inner wall of pressure tube 30. Floating piston 38 is seated within pressure tube 30 between piston assembly 32 and first end 40 of pressure tube 30. Floating piston 38 is configured to slide within pressure tube 30 towards and away from first end 40.

Fixed valve assembly 36 is fixedly mounted to pressure tube 30 between piston assembly 32 and floating piston 38. Between floating piston 38 and first end 40 of pressure tube 30 is defined a gas chamber 80. Gas chamber 80 can include air or any suitable gas (350 of FIG. 200), such as nitrogen. Between fixed valve assembly 36 and floating piston 38 is defined a compensation chamber 82. Between the piston assembly 32 and fixed valve assembly 36 is defined a compression chamber 84. Between piston assembly 32 and second end 42 is defined a rebound chamber 86. Compensation chamber 82, compression chamber 84, and rebound chamber 86 can include any suitable hydraulic fluid (300 of FIG. 20C), such as oil.

Fixed valve assembly 36 is fixed to pressure tube 30 between piston assembly 32 and gas chamber 80 forming the three chambers filled with oil, rebound chamber 86, compression chamber 84 and compensation chamber 82. Rebound chamber 86 is between rod guide assembly 46 and piston assembly 32. Compression chamber 84 is between piston assembly 32 and gas chamber 80. Compensation chamber 82 is between fixed valve assembly 36 and floating piston 38 and gas chamber 80 is between floating piston 38 and the first end 40.

During compression of monotube shock absorber 20, fluid is forced from compression chamber 84 to compensation chamber 82 through fixed valve assembly 36 generating an increase in pressure in compression chamber 84. Simultaneously, fluid is forced from compression chamber 84 to rebound chamber 86 through compression valving 54 of piston assembly 32 thus generating a decrease in pressure in rebound chamber 86. The pressure drop across fixed valve assembly 36 and the pressure drop across piston assembly 32 contribute to generating compression damping force. Due to the rise in pressure in compression chamber 84 during the compression stroke, compression damping force is not limited by the initial static pressure which is the case with a prior art monotube shock absorber. The initial static pressure can be kept low to reduce friction from the seal.

During an extension stroke of monotube shock absorber 20, fluid is forced from rebound chamber 86 to compression chamber 84 through extension valving 52 of piston assembly 32 thus generating an increase in pressure in rebound chamber 86. Simultaneously, fluid is drawn from compensation chamber 82 to compression chamber 84 through fixed valve assembly 36 thus generating a decrease in pressure in compression chamber 84. The pressure decrease in compression chamber 84 is made small by reducing the restriction to flow through fixed valve assembly 36 for an extension stroke. The pressure drop across piston assembly 32 primarily generates damping force during an extension stroke.

With continued reference to FIGS. 2 and 3 and additional reference to FIGS. 4 and 5, fixed valve assembly 36 will now be described in detail. The fixed valve assembly 36 generally includes a valve body 102 having a first side 104 and a second side 106, which is opposite to first side 104. Between first and second sides 104 and 106 is an outer surface of the valve body 102.

Valve body 102 defines extension valving 110 and compression valving 112. Extension and compression valving 110 and 112 can be any suitable valving to selectively permit passage of hydraulic fluid therethrough at desired rates and in desired directions. For example and as illustrated in FIG. 5, extension and compression valving 110 and 112 can each include a plurality of orifice holes defined within, and extending through, the valve body 102. Any suitable number of orifice holes can be included with extension valving 110 and compression valving 112, and the orifice holes can be arranged in any suitable manner. For example, the orifice holes of extension valving 110 can be arranged spaced apart in a generally circular arrangement about a center of valve body 102. Compression valving 112 can similarly include a plurality of spaced apart orifice holes arranged about an axial center of valve body 102, but arranged closer to the axial center than extension valving 110.

The orifice holes can have any suitable diameter to regulate flow of hydraulic fluid therethrough. Each plurality of orifice holes can include valve discs or plates to selectively permit passage of hydraulic fluid therethrough, and/or any suitable device or configuration suitable for regulating passage of hydraulic fluid therethrough. For example, a check valve 114 biased by a valve spring 116 can be included to regulate passage of hydraulic fluid through extension valving 110. A check valve 118 biased by a valve spring 120 can be included to regulate passage of hydraulic fluid through compression valving 112. Check valves 114 and 118, and valve springs 116 and 120, can be coupled to valve body 102 in any suitable manner, such as with a fastener 122.

The fixed valve assembly 36 can be fixedly secured within pressure tube 30 between the piston assembly 32 and floating piston 38 in any suitable manner. For example and as illustrated in FIGS. 3, 4 and 5, pressure tube 30 can be provided with a plurality of crimps or protrusions 130, such as in the form of crimps extending into a valve body recess 132 formed in valve body 102. Crimps 130 may form tube recesses at the outer wall of pressure tube 30. Fixed valve assembly 36 can be secured with any suitable number of crimps 130, such as eight. To prevent passage of hydraulic fluid between the outer surface of valve body 102 and the inner wall of pressure tube 30, valve body 102 can include any suitable seal, such as an O-ring 140.

Figures 4, 5, 6, 7:
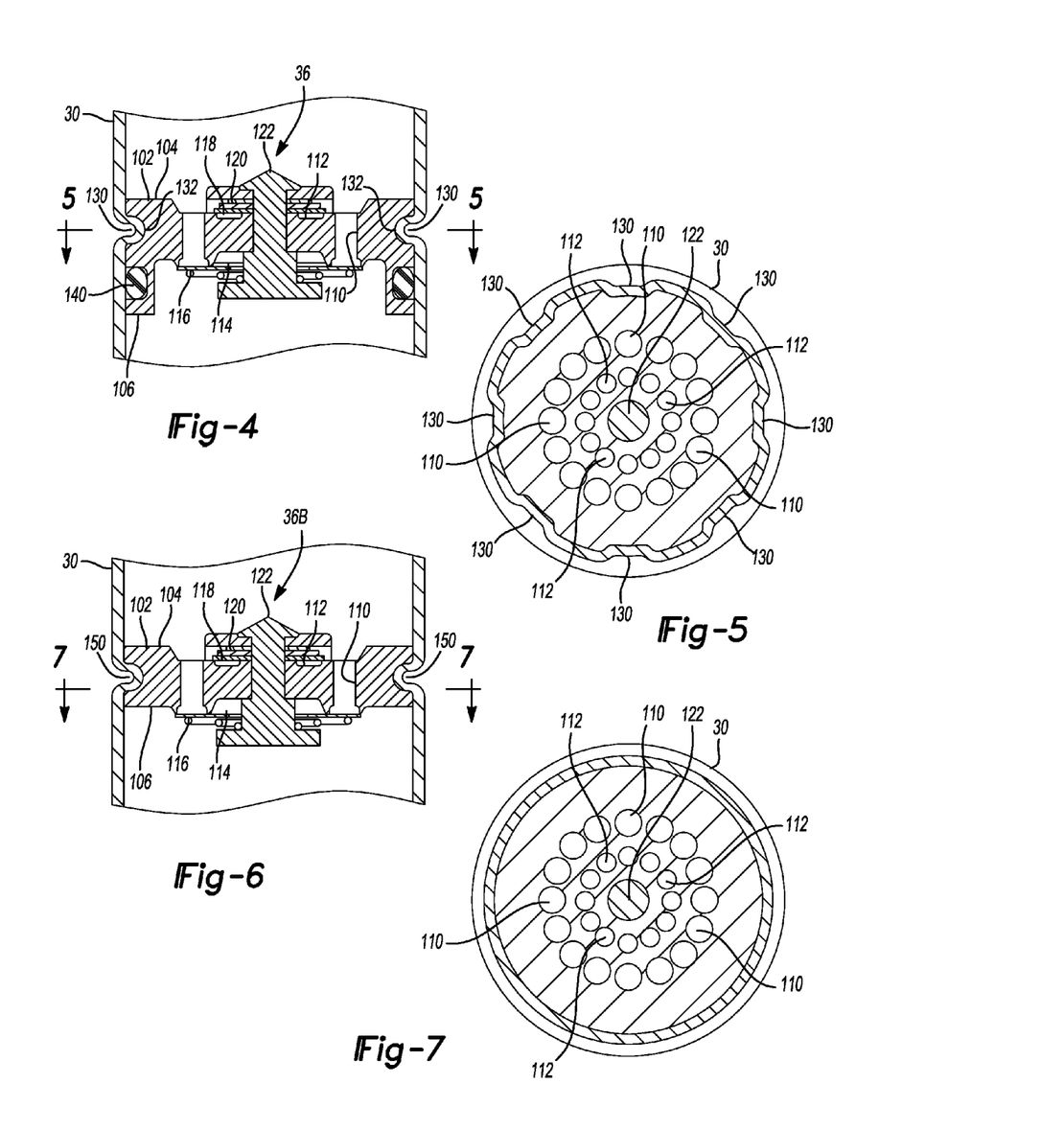
FIG. 4 is a cross-sectional view of a fixed valve assembly of the monotube shock absorber of FIG. 2 secured within a tube of the monotube shock absorber with a plurality of crimps.
FIG. 5 is a planar top view of the fixed valve assembly of FIG. 2 secured within the tube with a plurality of crimps.
FIG. 6 is a cross-sectional view of a fixed valve assembly secured within the tube with a 360° crimp.
FIG. 7 is a top view of the fixed valve assembly of FIG. 6 secured with the 360° crimp.

FIGS. 3, 4, and 5 illustrate one exemplary configuration for securing fixed valve assembly 36 within pressure tube 30. Any other suitable device, method, or configuration can be used to secure fixed valve assembly 36 within pressure tube 30. For example, FIGS. 6-19 illustrate additional fixed valve assemblies 36B-36N fixed to pressure tube 30 in a variety of different ways. Fixed valve assemblies 36B-36N are generally similar to fixed valve assembly 36, and thus like features are illustrated with like reference numerals. With respect to the like features, the description of the features set forth above and the discussion of fixed valve assembly 36 also applies to fixed valve assemblies 36B-36N. Features of any of the fixed valve assemblies 36-36N can be included in any of the other fixed valve assemblies 36-36N.

With initial reference to FIGS. 6 and 7, fixed valve assembly 36B is illustrated as secured to pressure tube 30 with a rolled crimp 150. Rolled crimp 150 can extend 360° around valve body 102, or any suitable distance about valve body 102. If rolled crimp 150 extends 360° about valve body 102, O-ring 140 may not be necessary because rolled crimp 150 will typically be sufficient to restrict flow of hydraulic fluid between valve body 102 and the inner wall of pressure tube 30. Other than being secured with rolled crimp 150, fixed valve assembly 36B is substantially similar to fixed valve assembly 36, and like features are illustrated with the same reference numbers.

Figure 8:
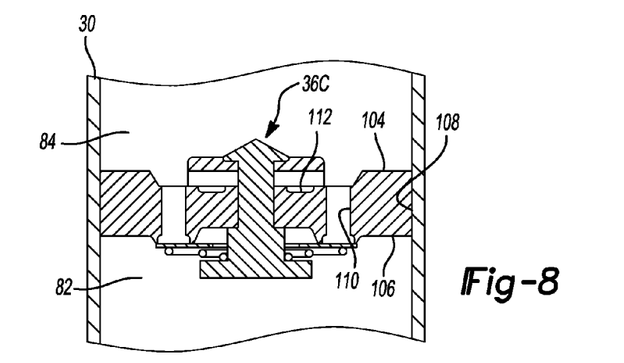
FIG. 8 is a cross-sectional view of a fixed valve assembly secured within the tube with a weld between the tube and the fixed valve assembly.

With reference to FIG. 8, valve body 102 of fixed valve assembly 36C includes a metal injection molded body, which is generally in contrast to, for example, valve body 102 of fixed valve assembly 36, which can be made of sintered iron or powder metal. Because valve body 102 of fixed valve assembly 36C is a metal injection molded valve body, valve body 102 of fixed valve assembly 36C can be welded directly to the inner wall of pressure tube 30, such as with a laser weld, a seam weld or any other welding operation. While valve body 102 of fixed valve assembly 36C is described as a metal injection molded valve body, valve body 102 of fixed valve assembly 36C can be manufactured as a screw machined part or manufactured by any means known in the art.

Figure 9:
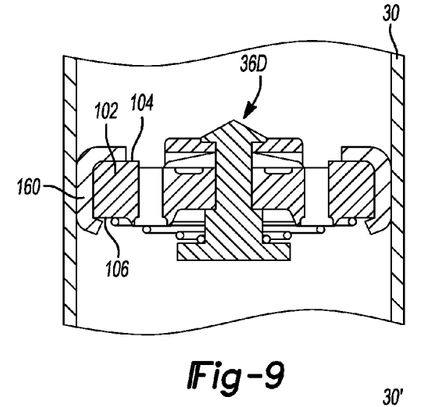
FIG. 9 is a cross-sectional view of a fixed valve assembly secured within the tube with a generally U-shaped collar welded to the tube and crimped onto the fixed valve assembly.

With reference to FIG. 9, fixed valve assembly 36D is fixably secured within pressure tube 30 with a collar 160. Collar 160 is made of any suitable material, such as stamped metal. Collar 160 is crimped around valve body 102 such that collar 160 extends from first side 104 to second side 106 around the outer surface of valve body 102. Collar 160 thus generally has a U-shaped cross-section as illustrated in FIG. 9. Collar 160 is welded to the inner wall of pressure tube 30 in any suitable manner, such as with a laser weld, a seam weld or any other welding operation. Valve body 102 can be made of a material that may not necessarily be suitable for welding directly to pressure tube 30, such as sintered iron or powder metal or may be made of any other material such as plastic, metal or any other suitable material.

Figure 10:
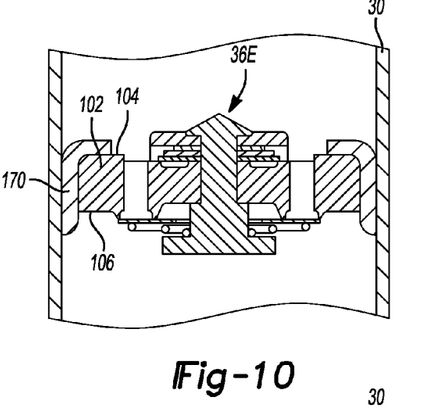
FIG. 10 is a cross-sectional view of a fixed valve assembly mounted with an L-shaped collar welded to the tube, the fixed valve assembly coupled to the L-shaped collar with a press-fit.

With reference to FIG. 10, fixed valve assembly 36E is secured to pressure tube 30 with a collar 170. Collar 170 can be made of any material suitable for being directly welded to the inner wall of pressure tube 30. Thus valve body 102 can be made of a material that is generally not suitable for welding directly to pressure tube 30, such as sintered iron or powder metal or may be made of any other material such as plastic, metal or any other suitable material. Collar 170 can be stamped of any suitable material and crimped around first side 104 of valve body 102 in order to provide collar 170 with a generally L-shaped cross-section in which collar 170 extends from first side 104 to and along the outer surface of valve body 102. Valve body 102 can be secured to collar 170 in any suitable manner, such as with a press-fit. Collar 170 can be secured to the inner wall of pressure tube 30 with a suitable weld, such as a laser weld, a seam weld or any other welding operation.

Figure 11:
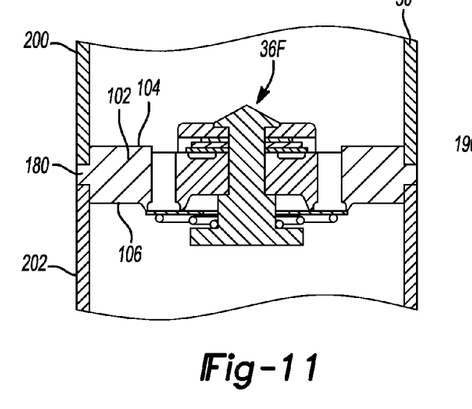
FIG. 11 is a cross-sectional view of a fixed valve assembly mounted between two tube portions of the tube with a weld between a flange of the fixed valve assembly and both the first and second tube portions on opposite sides of the flange.

With reference to FIG. 11, fixed valve assembly 36F includes a flange 180 extending from the outer surface of valve body 102. Flange 180 can be a continuous annular flange, or can be a plurality of spaced apart flanges. As illustrated in FIG. 11, pressure tube 30 need not be a continuous tube extending between first end 40 and second end 42, but may rather be a pressure tube assembly 30' which includes two or more separate tubes, such as a first tube 200 and a second tube 202. First tube 200 includes first end 40 and extends to fixed valve assembly 36F. Second tube 202 includes second end 42 and extends to fixed valve assembly 36F. Fixed valve assembly 36F is arranged such that flange 180 is between first and second tubes 200 and 202. First tube 200 is secured to a first side of flange 180, and second tube 202 is secured to a second side of flange 180. First and second tubes 200 and 202 are secured to flange 180 in any suitable manner, such as with a weld or any other means illustrated in this disclosure or by any means known in the art. Any suitable weld can be used, such as a seam weld, a laser weld or any other welding operation.

Figure 12:
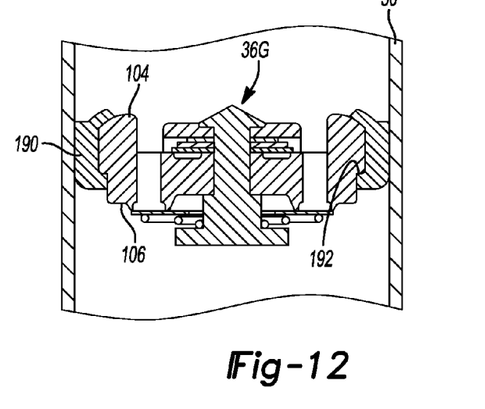
FIG. 12 is a cross-sectional view of a fixed valve assembly welded to the tube.

With reference to FIG. 12, fixed valve assembly 36G includes a collar 190, which can be cold-headed, forged or manufactured by any means known in the art. Collar 190 is crimped and bent around the outer surface of valve body 102 such that collar 190 extends from first side 104 to a flange 192 proximate to second side 106. Collar 190 extends around flange 192 in order to help couple collar 190 to valve body 102. Flange 192 is optional, and thus collar 190 may extend entirely to second side 106. Collar 190 may be secured to the inner wall of pressure tube 30 in any suitable manner, such as with a weld. Any suitable weld can be used, such as a seam weld, a laser weld or any other welding operation. In order to accommodate collar 190, pressure tube 30 can be provided with a larger inner diameter.

Figures 13, 14, 15:
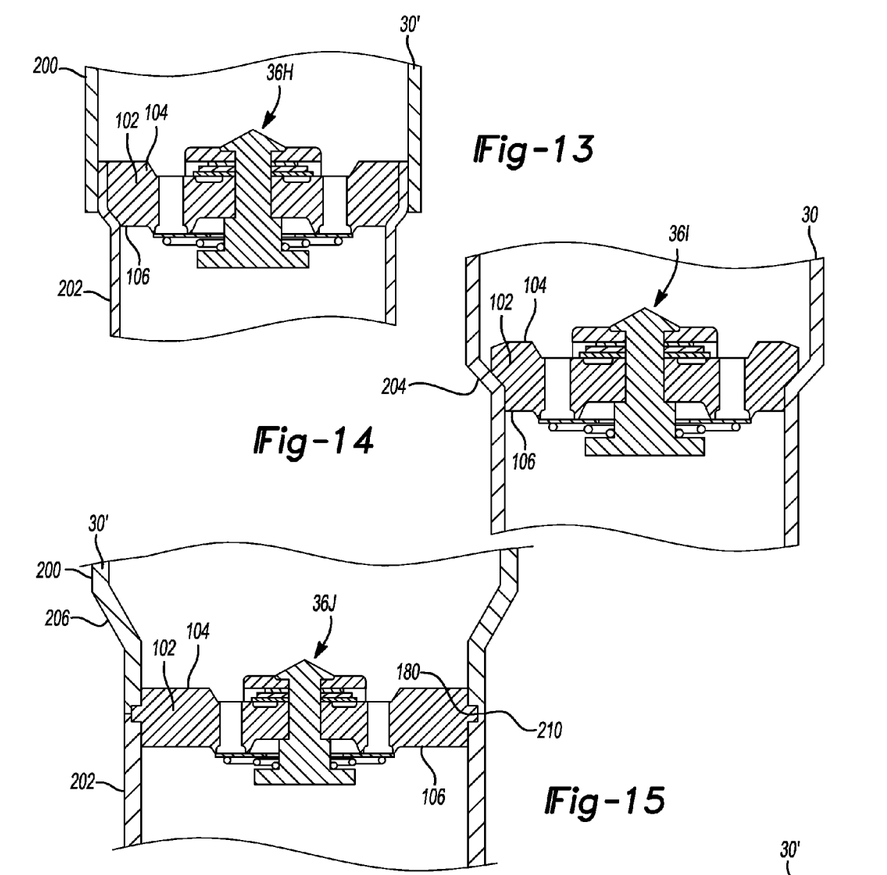
FIG. 13 is a cross-sectional view of a fixed valve assembly welded to the second tube at an interface between the first and second tubes.
FIG. 14 is a cross-sectional view of a fixed valve assembly secured at a stepped transition portion of a single piece tube with a weld.
FIG. 15 is a cross-sectional view of a fixed valve assembly secured to a single piece multi-diameter tube with a weld.

With reference to FIG. 13, fixed valve assembly 36H can be secured generally at an interface between first tube 200 and second tube 202 of pressure tube assembly 30'. First tube 200 can be provided with a larger diameter than second tube 202 and can be secured to second tube 202 with any suitable weld, such as a seam, laser weld or any other known welding operation between the inner wall of first tube 200 and the outer wall of second tube 202. Valve body 102 can be made of any suitable material configured to permit valve body 102 to be welded to second tube 202, such as with a laser weld or any other welding operation. For example, valve body 102 can be a metal injection molded valve body or manufactured by any means known in the art. Although FIG. 13 illustrates pressure tube assembly 30' as including separate first and second tubes 200 and 202, pressure tube assembly 30' can be replaced with a unitary pressure tube 30 as illustrated in FIG. 14.

FIG. 14 illustrates fixed valve assembly 36I secured at a transition portion 204 of pressure tube 30. Pressure tube 30 is unitary and generally flares outward at transition portion 204 such that the diameter of pressure tube 30 at a first portion is greater than at a second portion. Fixed valve assembly 36I is secured to pressure tube 30 at transition portion 204 in any suitable manner, such as with a laser weld or any other welding operation. The configurations of FIGS. 13 and 14 are advantageous for a plurality of reasons, such as because they permit optimized axial packaging by reducing the full compressed length of monotube shock absorber 20 while still maintaining the volume of chambers 80 and 82, and minimize valve body material.

With reference to FIG. 15, fixed valve assembly 36J includes flange 180. Pressure tube assembly 30' is split into first tube 200 and second tube 202. Pressure tube assembly 30' includes a tapered portion 206, which is part of first tube 200. Between tapered portion 206 and first end 40, pressure tube assembly 30' has a larger diameter as compared to the portion of pressure tube assembly 30' between tapered portion 206 and second end 42. Pressure tube assembly 30' is split into first and second tubes 200 and 202 in the smaller diameter area proximate to tapered portion 206. The first and second tubes 200 and 202 are secured together with flange 180 therebetween in any suitable manner, such as with a suitable weld 210. Any suitable weld can be used, such as a seam weld, a butt weld or any other welding operation. Pressure tube assembly 30' is thus provided with an expanded gas chamber 80 and an expanded compression chamber 82 between fixed valve assembly 36J and second end 42. Expanded chambers 80 and 82 reduce dead length of monotube shock absorber 20 and optimizes stroke for a given axial length while still maintaining the volume of chambers 80 and 82.

Figure 16:
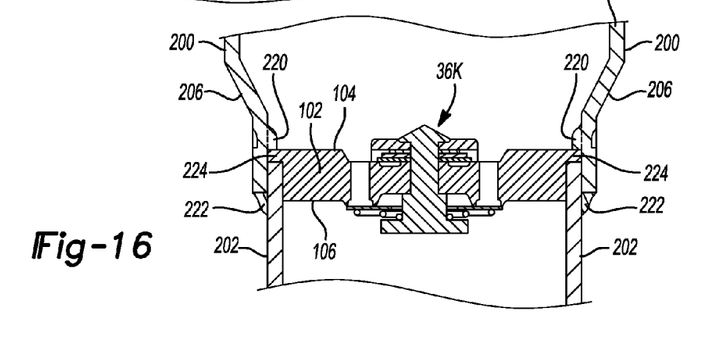
FIG. 16 is a cross-sectional view of a fixed valve assembly secured at an interface between first and second tubes of a tube assembly secured together with a weld, the fixed valve assembly is secured between the first tube and the second tube.

With reference to FIG. 16, fixed valve assembly 36K is secured within pressure tube assembly 30' where first tube 200 and second tube 202 of pressure tube assembly 30' are coupled together. First and second tubes 200 and 202 can be secured together in any suitable manner, such as with a weld 222. Weld 222 can be any suitable weld, such as a seam weld or any other welding operation formed where first and second tubes 200 and 202 overlap. First and second tubes 200 and 202 overlap such that the inner wall of first tube 200 abuts the outer wall of second tube 202. First tube 200 includes a plurality of flanges or tabs 220 formed in any suitable manner, such as by staking or by any other means known in the art. A flange 224 of fixed valve assembly 36K is seated between flanges/tabs 220 in second tube 202 in order to secure fixed valve assembly 36K at the interface between first and second tubes 200 and 202. First tube 200 has a larger diameter than second tube 202 in order to provide expanded chambers 80 and 82 as discussed above.

Figures 17, 18, 19:
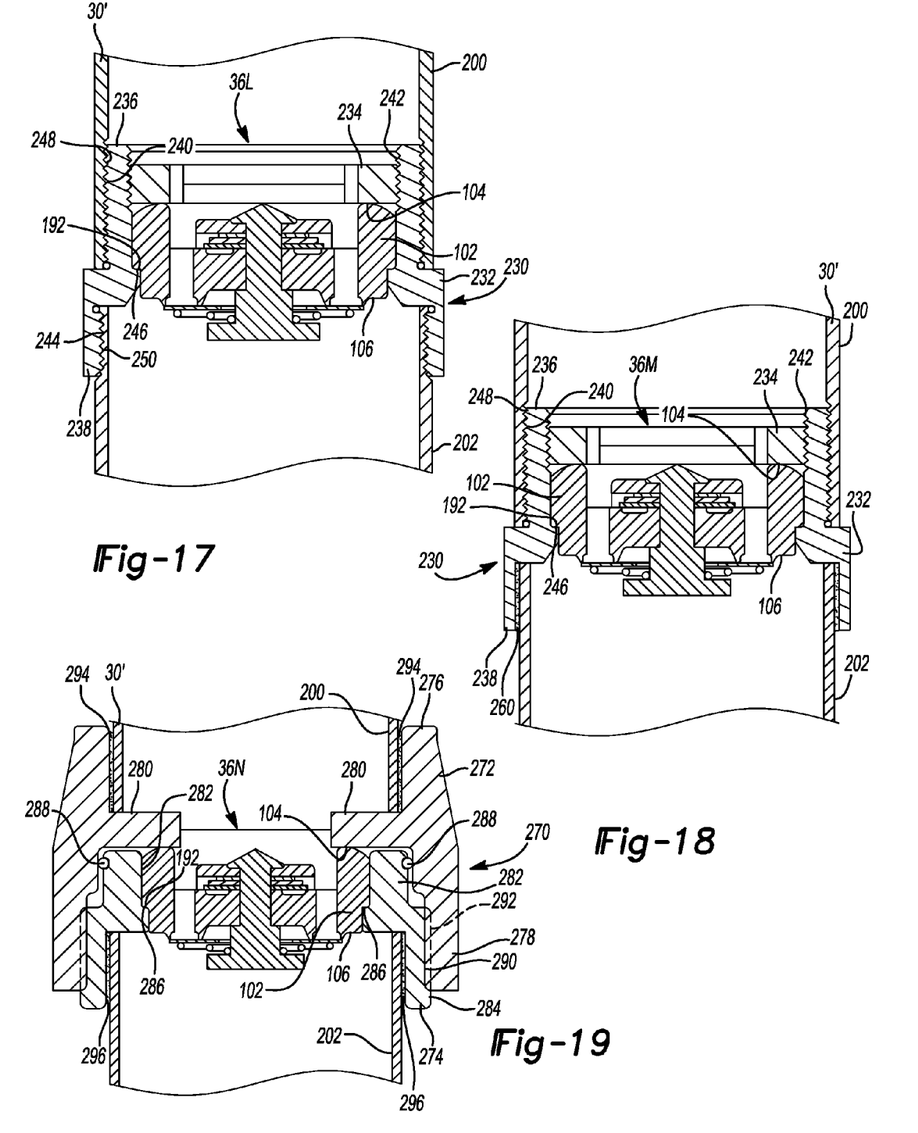
FIG. 17 is a cross-sectional view of a fixed valve assembly secured between first and second tubes of a tube assembly with an adaptor assembly threadably coupled to each of the first and the second tubes and a retention ring threadably coupled to the adaptor assembly.
FIG. 18 is a cross-sectional view of a fixed valve assembly between first and second tubes of a tube assembly with an adaptor assembly threadably coupled to the first tube and adhesively coupled to the second tube, as well as with a retention ring threadably coupled to the adaptor assembly.
FIG. 19 is a cross-sectional view of a fixed valve assembly mounted between first and second tubes with a first adaptor adhesively coupled to the first tube and with a second adaptor adhesively coupled to the second tube, the first and second adaptors are threadably coupled together.

With reference to FIG. 17, fixed valve assembly 36L is fixed within pressure tube assembly 30' with an adaptor assembly 230. Adaptor assembly 230 generally includes an adaptor 232 and a retention ring 234. Adaptor 232 includes a first flange 236, and a second flange 238. First flange 236 and second flange 238 extend from opposite sides of adaptor 232. First flange 236 includes first threads 240 and second threads 242. First threads 240 and second threads 242 are on opposite sides of first flange 236. Second flange 238 includes third threads 244 on an inner surface thereof. Adaptor 232 includes an inner protrusion or retention member 246. One or more retention members 246 can be included, and configured to abut flange 192 of valve body 102.

First threads 240 are configured to cooperate with internal threads 248 at the inner wall of pressure tube assembly 30' in order to secure adaptor 232 to first tube 200 of pressure tube assembly 30'. Third threads 244 are configured to cooperate with external threads 250 at the outer wall of pressure tube assembly 30' in order to secure adaptor 232 to second tube 202 of pressure tube assembly 30'. Retention ring 234 is generally an annular ring threadingly received by adaptor 232 and seated against first side 104 of valve body 102. Retention ring 234 generally abuts first side 104 of valve body 102 in order to retain valve body 102 against inner protrusion or retention member 246, and couple fixed valve assembly 36L to adaptor assembly 230. With reference to FIG. 18, fixed valve assembly 36M is affixed in pressure tube assembly 30' with adaptor assembly 230, but with second flange 238 affixed to the outer wall of pressure tube assembly 30' with an adhesive 260. Any suitable adhesive can be used. While threading and adhesives have been illustrated as attachment methods for adaptor 232 and retention ring 234, other methods including brazing, welding or any other attachment method known in the art can be utilized.

With reference to FIG. 19, fixed valve assembly 36N can be affixed within pressure tube assembly 30' with an adaptor assembly 270. Adaptor assembly 270 generally includes a first adaptor 272 and a second adaptor 274. First adaptor 272 generally includes a first flange 276 and a second flange 278. Between first and second flanges 276 and 278 is a first retention member 280, which can extend generally perpendicular with respect to first and second flanges 276 and 278 towards an axial center of pressure tube assembly 30'. First retention member 280 can be a ring, or one or more flanges. Second adaptor 274 generally includes a first flange 282 and a second flange 284. Second flange 284 defines a second retention member or flange 286 configured to abut and cooperate with flange 192 of valve body 102. First flange 282 further includes a seal 288, which can be any suitable seal, such as an O-ring. Second flange 284 further includes threads 290 on an outer surface thereof, which are configured to cooperate with threads 292 on an inner surface of second flange 278.

First adaptor 272 is arranged such that first retention member 280 is seated on an end of first tube 200 facing second tube 202. First adaptor 272 is secured to first tube 200 in any suitable manner, such as with an adhesive connection 294 between the outer wall of first tube 200 of pressure tube assembly 30' and first flange 276. Second adaptor 274 is secured to the outer wall of second tube 202 of pressure tube assembly 30' in any suitable manner, such as with an adhesive connection 296 between second flange 284 and the outer wall of second tube 202.

Second adaptor 274 is arranged such that second retention member 286 extends inward towards an axial center of pressure tube assembly 30' and such that second adaptor 274 is seated against an end of second tube 202 of pressure tube assembly 30' opposite to, and facing, first tube 200 of pressure tube assembly 30'. With valve body 102 seated against second adaptor 274 such that flange 192 of valve body 102 abuts second retention member 286 of second adaptor 274, first and second adaptors 272 and 274 are coupled together through cooperation between threads 290 of first adaptor 272 and threads 292 of second adaptor 274. Upon coupling first and second adaptors 272 and 274 together, first retention member 280 will abut first side 104 of valve body 102 in order to retain fixed valve assembly 36N in cooperation with adaptor assembly 270. In place of first retention members 280 can be retention ring 234, as illustrated in FIGS. 17 and 18 for example. While threading and adhesives have been illustrated as attachment methods for adaptor assembly 270, other methods including brazing, welding or any other attachment method known in the art can be utilized.

Operation of monotube shock absorber 20 will now be described. During a compression stroke of piston rod 34, hydraulic fluid, such as oil, is forced from compression chamber 84 into compensation chamber 82 through compression valving 112 of any of fixed valve assemblies 36-36N described herein.

Forcing hydraulic fluid into compensation chamber 82 from compression chamber 84 generates an increase in pressure in compression chamber 84. Simultaneously, hydraulic fluid is forced from compression chamber 84 into rebound chamber 86 through compression valving 54 of piston assembly 32. Forcing hydraulic fluid from compression chamber 84 into rebound chamber 86 generates a decrease in pressure in rebound chamber 86.

A pressure drop across fixed valve assembly 36-36N (pressure in compression chamber 84 minus pressure in compensation chamber 82) and a pressure drop across piston assembly 32 (pressure of compression chamber 84 minus pressure of rebound chamber 86) both contribute to generating compression damping force of monotube shock absorber 20. Due to the rise in pressure of compression chamber 84 during compression, compression damping force is not limited by initial static pressure of compression chamber 84, which is in contrast to conventional monotube shock absorbers in which compression damping force is limited to the initial static pressure of the shock absorber. Thus, the initial static pressure of compression chamber 84 of monotube shock absorber 20 can be kept low in order to reduce seal friction.

During extension of piston rod 34, hydraulic fluid is forced from rebound chamber 86 into compression chamber 84 through extension valving 52 of piston assembly 32, thus increasing pressure within rebound chamber 86. Simultaneously, hydraulic fluid is drawn from compensation chamber 82 into compression chamber 84 through extension valving 110 of fixed valve assembly 36-36N, thus decreasing pressure in compression chamber 84. The decrease in pressure of compression chamber 84 is made small by reducing the restriction on hydraulic fluid flow passing through extension valving 110 of fixed valve assembly 36-36N. The pressure drop across piston assembly 32 thus primarily generates extension damping force.

With reference to FIGS. 20A-20G, a method for assembling monotube shock absorber 20 including fixed valve assembly 36 will now be described. The method of FIGS. 20A-20G also applies to the fixed valve assemblies 36B-36N described herein, as well as to any other suitable fixed valve assembly, the only substantial difference being how the other fixed valve assemblies are secured within pressure tube 30 and/or pressure tube assembly 30'.

Figure 20A:
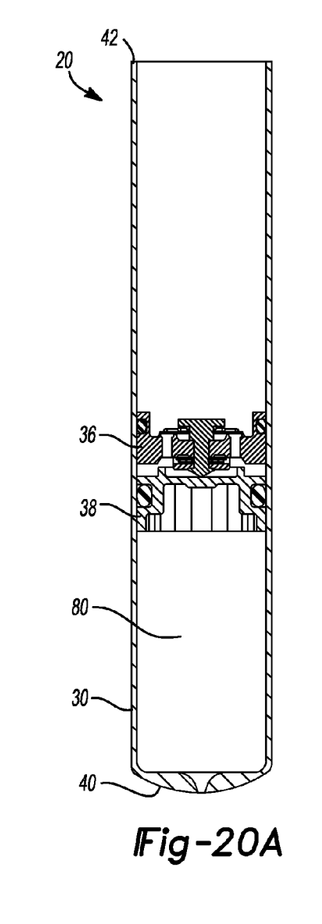
FIG. 20A illustrates insertion of a fixed valve assembly and a floating piston in a tube of a monotube shock absorber according to a method of the present teachings.
Figure 20B:
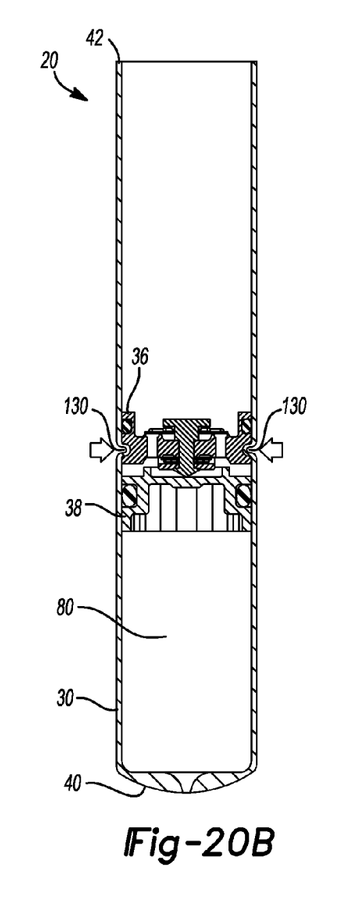
FIG. 20B illustrates securing the fixed valve assembly in the tube.

With initial reference to FIG. 20A, floating piston 38 and the fixed valve assembly 36 are inserted into pressure tube 30 from second end 42 and slid within pressure tube 30 towards first end 40. Floating piston 38 and fixed valve assembly 36 can be inserted using any suitable device, such as a pusher that allows air to escape out from within pressure tube 30 past the pusher. After fixed valve assembly 36 is inserted to a desired depth, fixed valve assembly 36 is secured in position by crimping pressure tube 30 (FIG. 20B)

at a specified location of pressure tube 30 using any suitable crimping device to form crimps 130, as illustrated in FIGS. 2 and 3 for example. While FIG. 20B illustrates a crimping operation, any other method of attachment of the fixed valve assembly described herein or known in the art can be utilized.

Figure 20C:
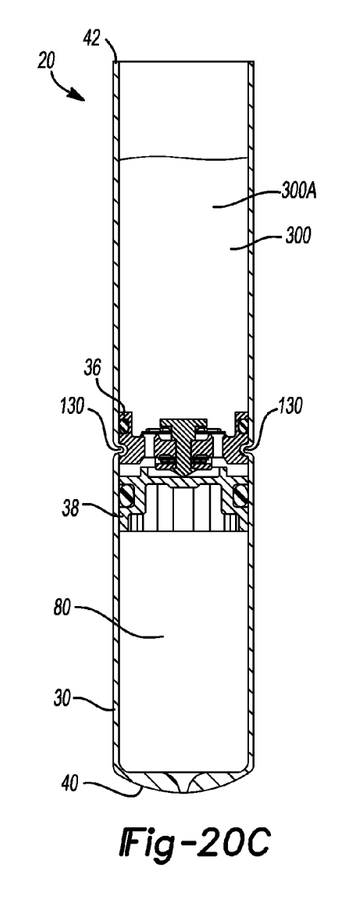
FIG. 20C illustrates addition of a first portion of hydraulic fluid within the tube.

With reference to FIG. 20C, after fixed valve assembly 36 is secured within pressure tube 30, pressure tube 30 is partially filled with hydraulic fluid 300, such as with a first amount 300A of hydraulic fluid 300. Hydraulic fluid 300 is located against fixed valve assembly 36 on a side thereof opposite to floating piston 38.

Figure 20D:
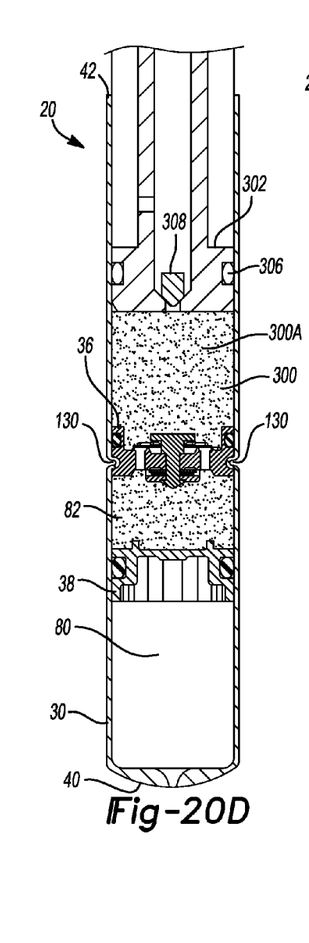
FIG. 20D illustrates pushing hydraulic fluid through the fixed valve assembly to move the floating piston away from the fixed valve assembly.

With reference to FIG. 20D, a suitable plunger, such as plunger 302, is used to push an amount of hydraulic fluid 300 through fixed valve assembly 36. Plunger 302 can be pushed with any suitable device. Plunger 302 includes an O-ring seal 306 and a check valve 308. O-ring 306 mates with the inner wall of pressure tube 30 to provide a seal therewith, which prevents hydraulic fluid 300 from passing between the plunger 302 and the inner wall of pressure tube 30.

Figure 20E:
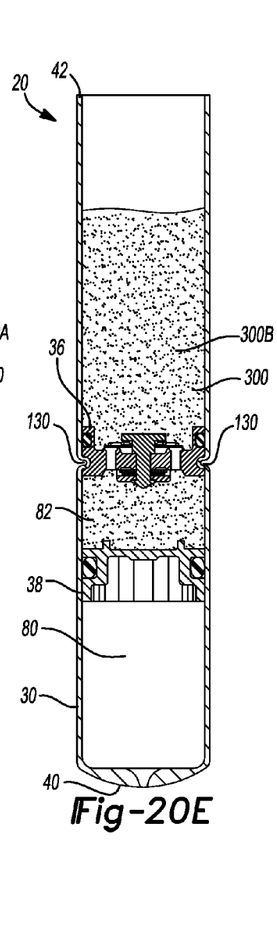
FIG. 20E illustrates addition of a second portion of hydraulic fluid within the tube.

Plunger 302 is initially seated within pressure tube 30 with check valve 308 open such that air can pass through check valve 308. Once plunger 302 reaches hydraulic fluid 300, check valve 308 is closed to permit plunger 302 to push hydraulic fluid 300 further within pressure tube 30. Using plunger 302, hydraulic fluid 300 is pushed through fixed valve assembly 36, and specifically through compression valving 112 thereof. Hydraulic fluid 300 contacts floating piston 38 and pushes floating piston 38 towards first end 40. Hydraulic fluid 300 fills compensation chamber 82 between floating piston 38 and fixed valve assembly 36. After plunger 302 is pushed to a desired distance, check valve 308 is opened and plunger 302 is removed. Opening check valve 308 allows air to pass through plunger 302, and prevents creation of a suction force, which may draw hydraulic fluid 300 back through fixed valve assembly 36. After plunger 302 is withdrawn from within pressure tube 30, additional hydraulic fluid 300 is added, such as a second amount 300B of hydraulic fluid 300. Together first and second amounts 300A and 300B of hydraulic fluid 300 provide the total amount of hydraulic fluid 300 for monotube shock absorber 20.

Figure 20F:
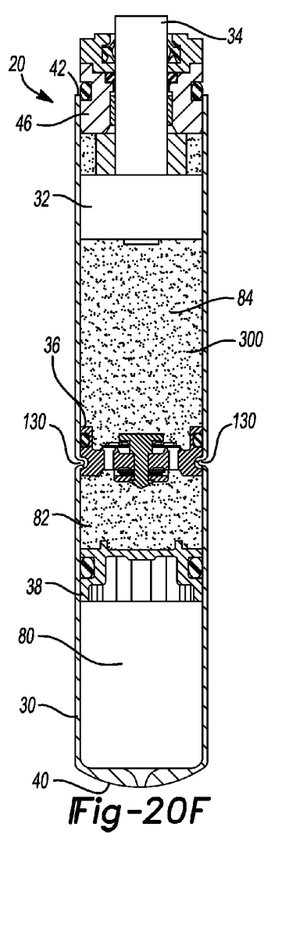
FIG. 20F illustrates positioning of a rod guide at an end of the tube.
Figure 20G:
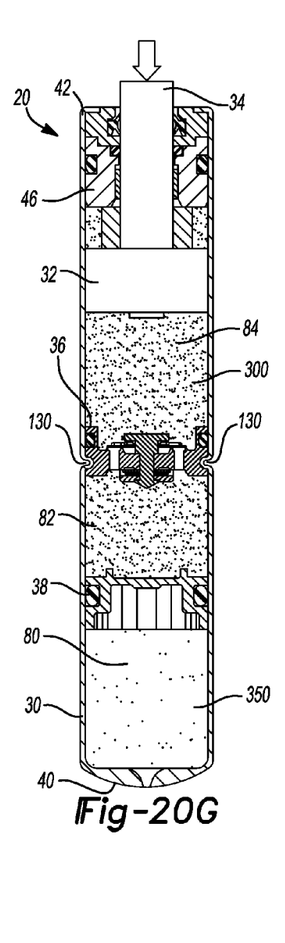
FIG. 20G illustrates insertion of the rod guide within the tube and charging the tube with gas.

With reference to FIG. 20F, rod guide assembly 46 with piston rod 34 and piston assembly 32 coupled thereto is inserted into pressure tube 30 from second end 42 of pressure tube 30. Rod guide assembly 46 is inserted into pressure tube 30 with piston assembly 32 spaced apart from rod guide assembly 46 to define a gap between piston assembly 32 and rod guide assembly 46. When rod guide assembly 46 is inserted to a depth within pressure tube 30 such that the tube seal is at second end 42 of pressure tube 30, hydraulic fluid 300 will make initial contact with rod guide assembly 46. Piston assembly 32 is at a controlled position with respect to rod guide assembly 46 based on the amount of hydraulic fluid 300A from the first fill and the stroke of the plunger 302 such that when the rod guide assembly 46 is inserted, the level of hydraulic fluid 300 will rise to meet the bottom of the rod guide assembly 46 at the same time the tube seal on the rod guide assembly 46 meets pressure tube 30.

With reference to FIG. 20O, as rod guide assembly 46 is pushed entirely into pressure tube 30, rod guide assembly 46 pushes hydraulic fluid 300 further through fixed valve assembly 36 to move floating piston 38 closer to first end 40. After rod guide assembly 46 has been inserted into pressure tube 30, piston rod 34 is fully extended and gas chamber 80 is charged with a pressurized gas, such as nitrogen, air or any other suitable gas through a suitable opening to gas chamber 80. After the rod guide assembly 46 has been inserted, the upper end of pressure tube 30 is closed by spin closing, crimping, welding, circlip or any other means known in the art. Then the gas chamber 80 is charged through the suitable opening and the first mount 44 is attached by welding, crimping or other means known in the art.

The present teachings provide numerous advantages over conventional monotube shock absorbers. For example, the present teachings provide for a fast response and resistance to fade often seen with conventional monotube shock absorbers due to physical separation of the hydraulic fluid and the gas, but do not experience the compression damping force limitation of conventional monotube shock absorbers. The monotube shock absorber 20 according to the present teachings can operate at lower pressure than conventional monotube shock absorbers, thus reducing friction at the seals thereof. The present teachings can further provide independent bleed tuning within the hydraulic valves, with compression bleed being controlled by fixed valve assembly 36-36N and rebound bleed being controlled by piston assembly 32. Due to the pressure increase in the compression chamber during compression, monotube shock absorber 20 according to the present teachings are not limited in the amount of compression damping that can be generated based on the charge of gas therein.

While floating piston 38 has been described as the means for separating the gas from the hydraulic oil, other methods such as diaphragms, bladders, bags, closed cell foams or other means known in the art can be utilized. Also, floating piston 38 can be replaced by a baffle as disclosed in co-pending application Ser. No. 14/459,537 filed the same day as the present application and entitled "Low Pressure High Compression Damping Monotube Shock Absorber Having A Baffle", the entire disclosure of which is incorporated herein by reference.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for assembling a monotube shock absorber comprising:
    inserting a floating piston and a fixed valve assembly in a tube such that the floating piston is between the fixed valve assembly and a first end of the tube to define a gas chamber between the floating piston and the first end of the tube;
    rigidly affixing the fixed valve assembly to the tube;
    adding a first amount of a hydraulic fluid into the tube from a second end of the tube that is opposite to the first end such that the hydraulic fluid covers a side of the fixed valve assembly that is opposite to the floating piston;
    advancing a plunger into the tube from the second end to push less than an entirety of the first amount of the hydraulic fluid through the fixed valve assembly and into contact with the floating piston to push the floating piston to a first distance away from the fixed valve assembly thereby defining a compensation chamber between the fixed valve assembly and the floating piston filled with the hydraulic fluid;
    adding a second amount of the hydraulic fluid into the tube from the second end;
    inserting a rod guide assembly into the tube from the second end with both a piston rod and a piston assembly coupled to the piston rod, as the rod guide assembly is inserted the hydraulic fluid passes through the piston assembly to occupy a gap between the piston assembly and the rod guide assembly and the hydraulic fluid is further pushed through the fixed valve assembly into the compensation chamber to move the floating piston to a second distance away from the fixed valve assembly and further towards the first end; and
    charging the gas chamber through an opening to the gas chamber.

2. The method of claim 1, further comprising advancing the plunger into the tube with a plunger valve thereof open until the plunger abuts the hydraulic fluid, closing the plunger valve, pushing the hydraulic fluid with the plunger valve closed, opening the plunger valve after pushing the hydraulic fluid, and retracting the plunger out from within the tube with the plunger valve open.

* * * * *

UNITED STATES PATENT AND TRADEMARK OFFICE
CERTIFICATE OF CORRECTION

PATENT NO. : 9,533,538 B2  
APPLICATION NO. : 14/459394  
DATED : January 3, 2017  
INVENTOR(S) : Daniel T. Keil et al.

Page 1 of 1

It is certified that error appears in the above-identified patent and that said Letters Patent is hereby corrected as shown below:

On the Title Page

(73) Assignee: Replace "Operating Automotive" with --Automotive Operating--

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*